United States Patent [19]

Arakawa et al.

[11] Patent Number: 5,787,301
[45] Date of Patent: Jul. 28, 1998

[54] PARALLEL COMPUTER SYSTEM

[75] Inventors: Osamu Arakawa; Tadaaki Isobe, both of Hadano; Toshimitsu Ando, Isehara; Masato Ishii, Sagamihara; Shigeo Takeuchi, Hanno, all of Japan

[73] Assignees: Hitachi, Ltd.; Hitachi ULSI Engineering Corp., both of Tokyo, Japan

[21] Appl. No.: 407,843

[22] Filed: Mar. 21, 1995

[30] Foreign Application Priority Data

Mar. 24, 1994 [JP] Japan ................................ 6-053412

[51] Int. Cl.$^6$ ................................................ G06F 15/16
[52] U.S. Cl. ........................ 395/800.2; 395/200.78; 395/800.29; 395/553; 395/800.3
[58] Field of Search ........................ 395/800, 650, 395/375, 200.78, 800.2, 553, 200.31, 800.3, 800.29

[56] References Cited

U.S. PATENT DOCUMENTS 5,371,896  12/1994  Gove et al. ........................ 395/800

FOREIGN PATENT DOCUMENTS

A-5-265976  10/1993  Japan.

OTHER PUBLICATIONS

Beckmann et al. "Fast Barrier Synchronization Hardware"; pp. 180–189; Nov. 1990.

Primary Examiner—Larry D. Donaghue
Attorney, Agent, or Firm—Antonelli, Terry, Stout & Kraus, LLP

[57] ABSTRACT

A parallel computer system includes a plurality of processor units, a data transfer network for interconnecting the processor units, a synchronizing network for allowing program execution to be performed synchronously by the individual processor units, a connecting unit for connecting the individual processor units and the synchronizing network, and an input unit connected to the synchronizing network. The connecting unit connects selectively the individual processor units to the synchronizing network in accordance with information inputted via the input unit. With the parallel computer system, a program can be executed synchronously in parallel by using a desired number of processor units of those incorporated in the system, whereby availability of processor resources of the system can be enhanced.

5 Claims, 3 Drawing Sheets

FIG.3

| No. | CONDITIONS | 213 (PU SYNCHRONIZATION DISABLE) | 232 (PORT ENABLE) | 214 (SYNCHRONIZATION POINT) | 251 (INPUT TO SYNCHRONIZATION DECISION UNIT) |
|---|---|---|---|---|---|
| 1 | PROCESSOR SYNCHRONIZATION ENABLE (BEFORE REACHING SYNCHRONIZATION POINT) | 0 | 0 | 0 | 0 |
| 2 | PROCESSOR SYNCHRONIZATION ENABLE (AFTER REACHING SYNCHRONIZATION POINT) | 0 | 0 | 1 | 1 |
| 3 | PORT DISABLE (DISCONNECTION OF FAULT-SUFFERING PROCESSOR) | X | 1 | X | 1 |
| 4 | PROCESSOR SYNCHRONIZATION DISABLE (INDEPENDENT PROCESSING EXECUTION) | 1 | 0 | X | 1 |

PARALLEL COMPUTER SYSTEM

BACKGROUND OF THE INVENTION

The present invention relates to a parallel computer system which includes a plurality of processor units interconnected by a network so as to be capable of executing a program or information processing in synchronism with one another.

This type parallel computer system is used, for example, for numerical analyses of physical phenomena.

When a physical phenomenon is to be numerically or mathematically analyzed by using a computer system, processings mentioned below are executed. At first, a differential equation which describes a physical phenomenon of concern is defined. Subsequently, simultaneous linear equations are obtained generally by performing appropriate discrete approximation. Then, initial condition and boundary condition are applied to the differential equation to obtain solution of the simultaneous linear equations by resorting to an iterative solution method. According to the iterative solution method, a solution processing, a convergence error detection processing for the solution and a convergence decision processing are repeated until the convergence error becomes smaller than a predetermined value.

FIG. 2 of the accompanying drawings illustrates a processing flow which is executed when the numeric or mathematic calculation processing is executed by using a parallel computer system. At the beginning, the numerical calculation processing is divided into processings (hereinafter referred to as the subprocessings) 101, 102, 103 and 104. In this conjunction, let's suppose that changes of temperatures as a function of time at a number of locations within a certain region are simulated through a numerical calculation. In that case, the region may be divided into a plurality of small-size areas or subregions, wherein individual processor units of the parallel computer system are allocated for executing numerical calculation of the temperatures in the subregions, respectively.

In succession, boundary data 111, 121, 131 and 141 are inputted to the individual processor units, respectively. In the case of the arithmetic temperature determination under consideration, the temperature at a location within a given one of the subregions is mathematically determined on the basis of temperatures at locations within the adjacent subregions. Accordingly, the processing involved at this stage is directed to the transfer of data concerning the temperatures at the individual locations among the processors.

After having loaded the initial conditions to the individual processor units in this manner, the arithmetic processing is started in each of the processor units. The arithmetic processing in each of the processor units is temporarily stopped at a predetermined point for synchronization (see a step 151 in FIG. 2). By providing the synchronization point, there can be realized communication for data transfer among the processor units. The synchronization point may be so set as to coincide with a time point when the arithmetic operation has been performed for a predetermined number of times in each of the processor units.

When there exists such processor unit for which the arithmetic operation executed thereby does not exhibit convergence (step 161), the boundary data 111, 121, 131 and 141 are again loaded into the individual processor units, respectively, for thereby allowing the arithmetic operations to be continued.

When the arithmetic operations executed by the individual processor units result in convergence after repetition of the data transfer among the processors as mentioned above, it is then determined that the solution as desired can be obtained, whereupon the parallel processing comes to an end.

As can be seen from the above description, when a mathematic processing is divided into a plurality of subprocessings which are executed by individual processors provided separately, there often arises the, necessity of setting the synchronization point for each of the arithmetic subprocessings in order to allow the individual processor units to execute the respective processings in a cooperative or coordinated manner. Needless to say, the concept of the synchronization point (or point for synchronization) is never limited to the above-mentioned exemplary case but can be applied to numerous mathematic processings where establishment of synchronization is required for a plurality of processor units partaking in the parallel processings, which are often encountered in many practical applications.

As a method of realizing the synchronization among a plurality of processors, there may be mentioned a barrier synchronization network scheme according to which all the processor units taking part in execution of a processing are synchronized with one another and a message communication scheme according to which the synchronization is established among only those processor units which are to execute subprocessings associated with one another.

In a parallel processor system implemented on the basis of the first mentioned method and disclosed in JP-A-5-265976, a network dedicated for establishing synchronization among the individual processor units is provided with a view to increase the processing speed. This known system further includes a synchronization decision circuit connected to the network so that signal bits indicating whether or not the individual processor units have reached the synchronization point are supplied to the decision circuit via the network. On the other hand, information indicating that all the processor units have reached the synchronization point is broadcasted to the individual processor units from the decision circuit via the network.

The conventional system based on the barrier synchronization network concept suffers a shortcoming that when one of the processor units is incapable of sending out the bit indicating whether or not that one processor unit has attained the synchronization point because of occurrence of some fault, the information indicating that all the processor units have reached the synchronization point can never be transmitted to the individual processor units from the synchronization decision circuit for ever. Such a situation can be cleared only by replacing the fault suffering processor unit by a sound one. It is however noted that a method of applying a time-out management to the processings executed by the individual processors for thereby avoiding the deadlock is not effective remedy measures for the simulation processing which involves numerical calculations over an unpredictable extended time.

Furthermore, the system based on the conventional barrier synchronization network scheme is limited in respect to the applicability because all the processor units constituting the system are so arranged as to operate in synchronism with one another. To say in another way, it is impossible to select arbitrarily the number of the processor units which are put into synchronous processing operation.

SUMMARY OF THE INVENTION

In the light of the state of the art described above, it is an object of the present invention to provide a parallel computer system which is capable of continuing synchronous parallel processing units even in the situation where some of the processors constituting the parallel computer system are incapable of executing the allocated processing(s).

Another object of the present invention is to provide a parallel computer system which is capable of executing synchronous parallel processings by selecting a given number of processors from those incorporated in the parallel computer system.

In view of the above and other objects which will become apparent as description proceeds, there is provided according to an aspect of the present invention a parallel computer system which is comprised of a plurality of processor units for executing programs, wherein each of the processor units includes a first storage for storing information indicating whether or not a corresponding processor unit is to execute a program in synchronism with execution of the program by the other processor units, and a second storage for storing information indicating whether or not execution of a program by the corresponding processor unit has attained a point for synchronization. The parallel computer system further includes a network for inter-connecting the plurality of processor units, and a means connected to the network for selectively receiving the information stored in the second storage means incorporated in the processor unit which is indicated by the information of the first storage means to execute the program in synchronism with other processor unit(s) and informing the processor units of completion of synchronization when all of the information indicate that executions of the program in the processor units have reached a point for synchronization.

Further, according to another aspect of the present invention, there is provided a parallel computer system which is comprised of a plurality of processor units for executing programs, wherein each of the processor units including a first storage for storing information indicating whether or not execution of a program by a corresponding processor unit has attained a point for synchronization, a network for interconnecting the plurality of processor units, a second storage connected to the network in correspondence to the processor units, respectively, for storing information indicating whether the information stored in the corresponding first storage means is valid or not, and a circuit connected to the network for selectively receiving the information stored in the first storage means incorporated in the processor units for which the second storage indicates that the information stored in the first storage is valid, and informing the processor units of completion of synchronization when all of the information indicate that execution of the program in the processor units have reached a point for synchronization.

According to yet another aspect of the present invention, there is provided a parallel computer system which includes a plurality of processor units for executing programs, a network for interconnecting the plurality of processor units, a memory for storing information indicating whether or not execution of a program by each of the processor units is to be synchronized with executions of the program by the other processor unit(s), and a unit for inputting the information, wherein the plurality of processor units execute synchronously the program on the basis of the input information.

Thus, with the arrangements of the parallel computer system according to the teachings of the present invention, the can be obtained advantages mentioned below. When the simultaneous or parallel processings are stopped due to a fault of any one of the processors incorporated in the parallel computer system, such a register setup is performed by the service processor connected to the network that the processor suffering the fault is disconnected from the synchronizing network for allowing the simultaneous or parallel processings to be restarted or resumed.

Further, by virtue of such arrangement that a processor can alter or modify the register setup for the processor, it is possible to execute the simultaneous or parallel mathematic processings with a desired number of processors. Thus, the processor unit excluded from the simultaneous or parallel mathematic processings can be assigned to execution of other applications such as execution of a server program, a front end program or the like, whereby availability of the system resource can effectively be enhanced.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 3 is a chart for illustrating example of register settings according to an embodiment of the invention.

DESCRIPTION OF THE PREFERRED EMBODIMENTS

Now, the present invention will be described in detail in conjunction with what is presently considered as preferred or exemplary embodiments thereof by reference to the drawings.

Figure 1:
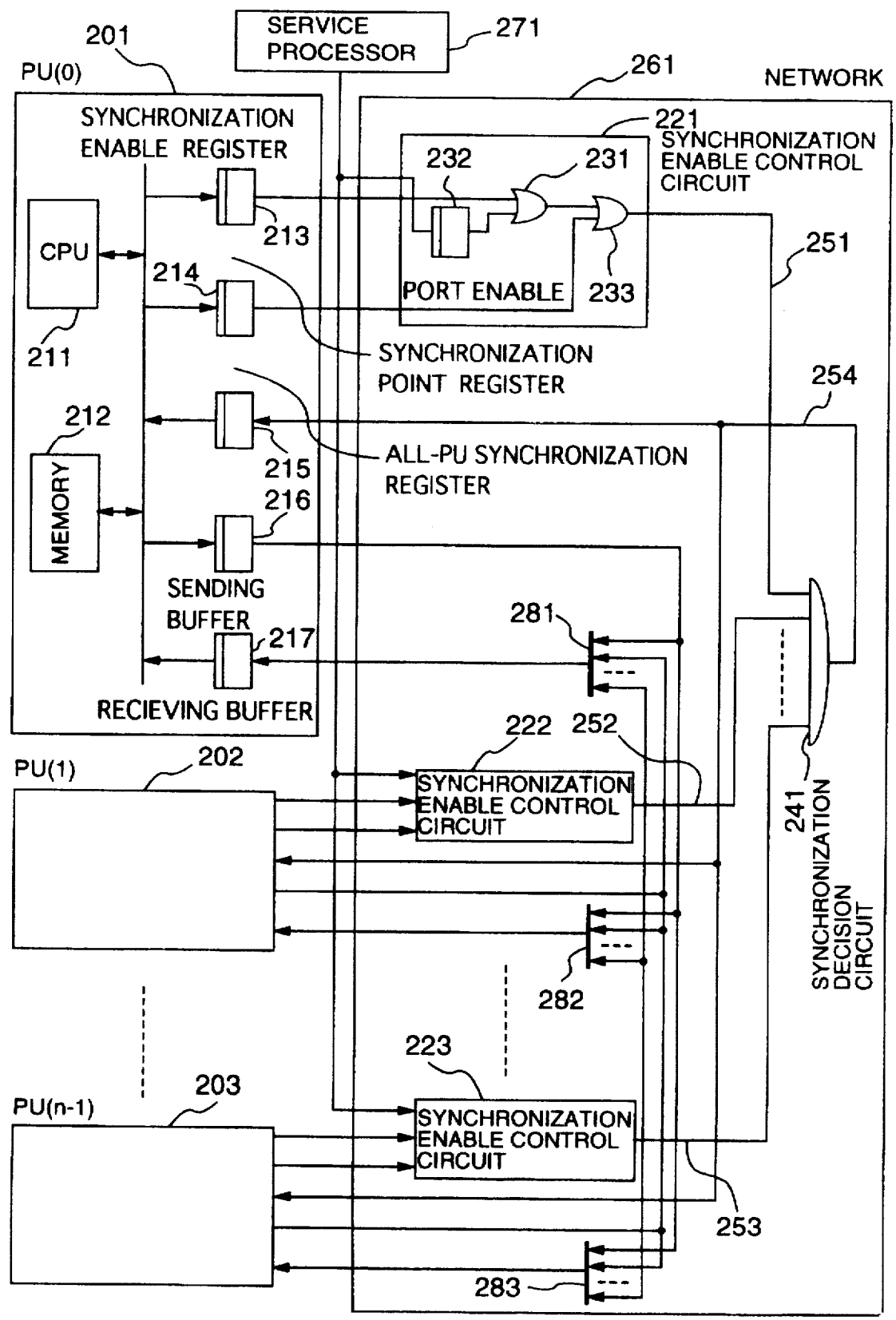
FIG. 1 is a schematic circuit diagram showing a structure of a parallel computer system according to a preferred embodiment of the present invention.
Figure 2:
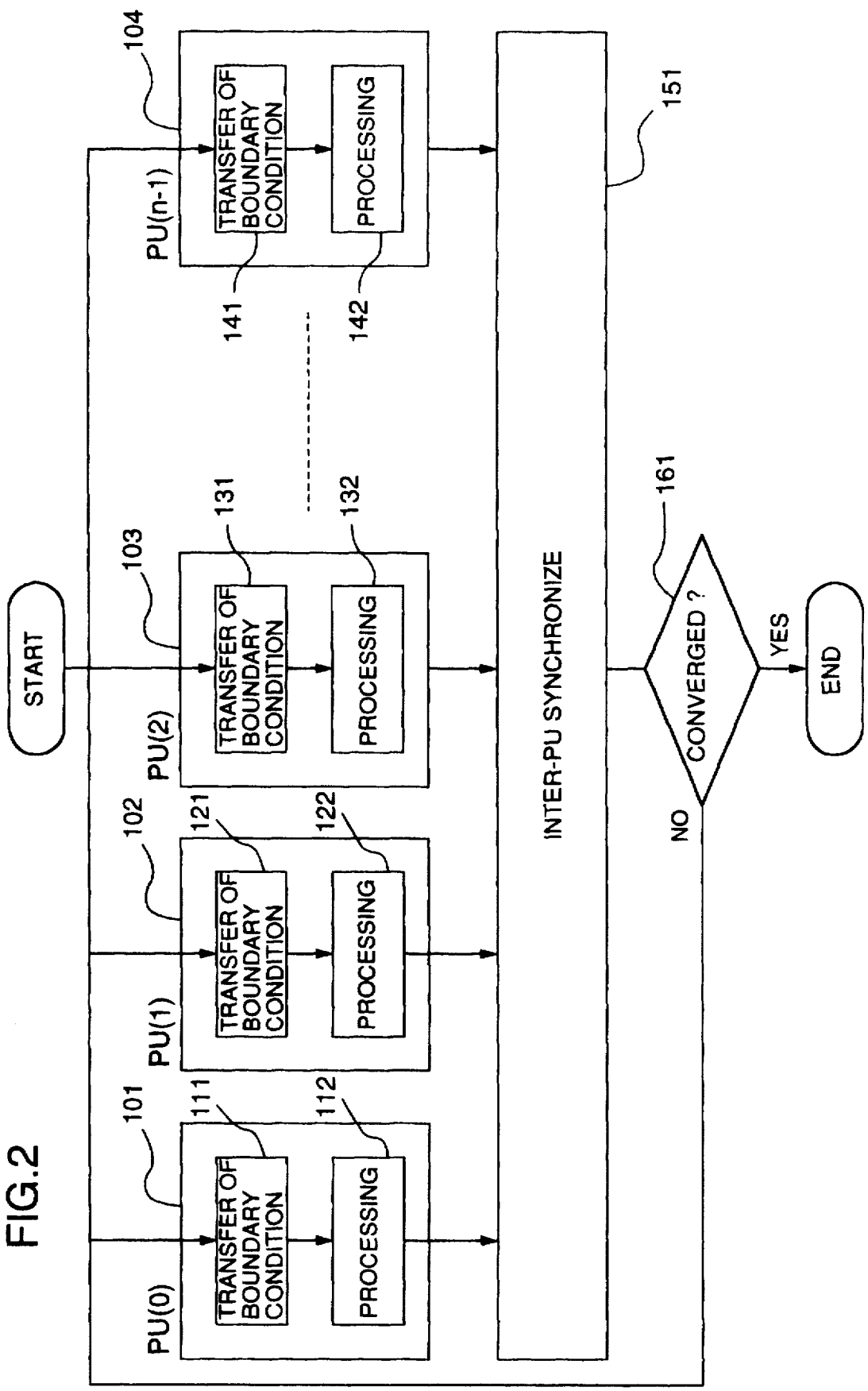
FIG. 2 is a flow chart for illustrating a processing flow which is executed when numeric or mathematic calculation is performed by using a parallel computer system.

FIG. 1 shows a structure of a parallel computer system according to a preferred embodiment of the present invention. As can be seen in the figure, the parallel computer system is comprised of individual processor units labeled PU(0), PU(1), . . . , PU(n−1) and designated by reference numerals 201, 202 and 203, respectively. These processor units (hereinafter also referred to as the PU in abbreviation) are identical with each other in respect to the internal structure thereof. Accordingly, the following description will be directed to the processor unit PU(0) 201, representatively, being understood that the description holds true for other processor units unless otherwise specified. In this conjunction, it should however be noted that the parallel computer system under consideration may be composed of a set of processor units whose internal structures differ from one another. A network 261 is employed for realizing data transfer among the individual processor units as well as for establishing synchronism among the processings executed by these processor units. A service processor 271 is provided for starting the operation of the parallel computer system, setting up the system configuration, coping with occurrence of a fault in the parallel computer system, performing maintenance of the system and for other purposes.

Upon execution of a program which is stored in a secondary storage unit (not shown), the program is transferred to a memory 212 via a processor bus (not shown either). A CPU (Central Processing Unit) 211 executes the program stored in the memory 212. Data required for execution of the program is also stored in the memory 212. Division of the program into subprograms and transfer of the subprograms to a plurality of the individual processor units in order to allow the program to be executed in parallel by these processor units are realized by an operating system (OS) or a parallel processing supporting application program, details of which are known for these skilled in the art.

Registers 213, 214 and 215 are provided for establishing a barrier synchronization among the processor units PU(0), PU(1), . . . . PU(n−1). The PU synchronization enable register 213 stores information indicating whether or not a processor of the processor unit of concern can be utilized for synchronous parallel processing of a program. The content of the PU synchronization enable register 213 is rewritten by the CPU 211. By way of example, when a parallel processing is to be executed by using the processor unit PU(0) 201, the operating system may issue to the CPU 211 a command for rewriting the content of the synchronization enable register 213 in precedence to execution of the parallel processing. Thereafter, the relevant processor unit PU(0) 201 is recognized by the network 261 as the processor unit which is to take part in the synchronous parallel processing. In the case of the instant embodiment of the invention, the state of logic "0" of the synchronization enable register 213 indicates that the CPU 211 takes part in the synchronous parallel processing, while the logic "1" state of the synchronization enable register 213 indicates that the CPU 211 does not partake in the synchronous parallel processing.

It goes without saying that the content of the synchronization enable register 213 can be rewritten, as occasion requires. It should however be mentioned that in most cases, rewriting of the content of the synchronization enable register 213 is inhibited when a program is being executed.

On the other hand, the register 214 serves as a synchronization point register for indicating whether the processing of a program being executed by the CPU 211 has reached a point for synchronization. The meaning of the phrase "point for synchronization" or "synchronization point" has previously been defined in the preamble portion of this specification. When the processing has attained the point for synchronization, the CPU 211 sets a synchronization point flag (logic "1") in the synchronization point register 214, whereupon the CPU 211 waits for that the processings in all the processor units partaking in the simultaneous parallel processing have reached the point for synchronization.

When all the processor units partaking in the parallel processing have reached the point for synchronization, a flag indicating establishment of synchronization among all the processor units is set in the register 215 which serves as an all processor unit synchronization register by a synchronization decision unit 241. Subsequently, the CPU 211 clears the flag indicating the point for synchronization from the synchronization point register 214, whereupon the CPU continues execution of the processing for the program.

A synchronization enable control circuit 221 is provided in association with each of the processor units for controlling connection between the associated processor unit and the CPU 211. The synchronization enable control circuit 221 serves for designating the processor unit which is to partake in the synchronous parallel processing of a program under the control of the service processor. Unless the service processor is used, an OR circuit 231 and a port enable register 232 may be spared, wherein the synchronization enable register 213 and the synchronization point register 214 may be directly connected to an OR circuit 233.

The port enable register 232 is set to logic "0" state by the service processor 271 when the processor unit PU(0) is to take part in the synchronous parallel processing, while the port enable register 232 is set to logic "1" when the processor unit PU(0) is not to partake in the parallel processing.

In this manner, the output 251 of the synchronization enable control circuit 221 assumes the logic "1" state when any one of the conditions mentioned below is satisfied.

(1) The parallel processing in the corresponding or associated processor unit has reached the point for synchronization with the synchronization unit flag being set in the synchronization point register 214.

(2) The content of the synchronization enable register 213 is set to logic "1" by the CPU 211 (i.e., it is designated by the CPU 211 that the CPU 211 is not to partake in the synchronous processing).

(3) The port enable register 232 is set to the logic "1" state by the service processor 271 (i.e., it is designated by the service processor 271 that the CPU 211 is not to take part in the synchronous processing).

When any one of the conditions is met, the synchronization decision unit 241 detects or recognizes that the parallel processing being executed by the processing unit PU(0) has reached the point for synchronization.

The synchronization decision unit 241 determines on the basis of information inputted via lines 251, 252 and 253 whether or not the processings executed by all the processor units which partake in the synchronous parallel processing have reached the point for synchronization. To this end, the synchronization decision unit 241 may be constituted by an AND circuit. When the outputs from all the synchronization enable circuits assume the logic "1", the synchronization decision unit 241 sets the all-PU synchronization flag in the registers 215 of all the processor units via the line 251.

A sending buffer 216 and a receiving buffer 217 are provided for transferring data among the individual processor units. The data as sent out from the sending buffer 216 in a packet format is transferred to the destination processor unit via a change-over switch 281, 282 or 283. To this end, the packet data contains network address information indicating the destination processor. Thus, the change-over switch 281, 282 or 283 can change over the data sending route in accordance with the address information mentioned above.

For illustrating clearly the operations of the parallel computer system according to the instant embodiment of the invention, FIG. 3 shows logical values on the input lines to the synchronization enable register 213, the synchronization point register 214, the port enable register 232 and the synchronization decision unit 241 in various states.

As described hereinbefore, the synchronization enable register 213 is set by the associated processor unit in precedence to the start of execution of program. Further, the content of the port enable register 232 is rewritten by the service processor 271 upon setting up of the system configuration.

On the other hand, the content of the synchronization point register 214 is rewritten by the CPU 211 in the course of execution of a program.

Referring to FIG. 3, the state No. 1 shows the logic values when the processor 211 is set so as to partake in the barrier synchronization with the processing being yet short of the synchronization point.

The state No. 2 shows the logic values when the processor 211 is set so as to partake in the barrier synchronization with the processing reaching the synchronization point.

The state No. 3 shows the logic state when the port enable register 232 is set to logic "1" by the service processor 271 with the processor unit PU(0) being disconnected from the barrier synchronization network. This sort of setup is validated, for example, when the processor unit PU(0) suffers a fault, when the port enable register 232 is set to logic "1", the input to the synchronization decision unit 241 is fixed to the logic "1" level. Thus, the barrier synchronization processing for the other processor units can be executed without being accompanied with any problems. This means that even when any one of the processor units constituting the parallel processing system suffers a fault, the synchronous parallel processing can nevertheless be continued by using the remaining processor units.

Of course, the number of the processor units which partake in the synchronous parallel processing can be selected arbitrarily by using the service processor in accordance with the content of the parallel processing regardless of absence or occurrence of a fault.

The state No. 4 shows the logic values when the processor unit PU(0) is so set as not to partake in the synchronous parallel processing by the CPU 211 itself. With this setup, the input to the synchronization decision unit 251 is fixed to the logic "1" level. The barrier synchronization processing can be executed by the other processor units without incurring any problems.

The mode mentioned just above is effective in the case where the processor unit PU(0) is to execute a program for which the barrier synchronization is unnecessary, e.g. a front end processing, a server processing program or the like. In other words, the processor unit PU(0) can execute the program mentioned above in parallel with the synchronous parallel processing executed by the other processor units.

Of course, hardware components required for achieving the purpose of the present invention can be substituted by software or software modules having equivalent functions.

Many features and advantages of the present invention are apparent form the detailed description and thus it is intended by the appended claims to cover all such features and advantages of the system which fall within the true spirit and scope of the invention. Further, since numerous modifications and combinations will readily occur to those skilled in the art, it is not intended to limit the invention to the construction and operation illustrated and described. Accordingly, all suitable modifications and equivalents may be resorted to, falling within the spirit and scope of the invention.

We claim:

1. A parallel computer system, comprising:
    a plurality of processor units for executing programs;
    each of said processor units including first storage means for storing information indicating whether or not execution of a program by said corresponding processor unit has attained a point for synchronization;
    a network for interconnecting said plurality of processor units; said network comprising:
    second storage means in correspondence to said processor units, respectively, for storing information indicating whether the information stored in said first storage means is valid or not; and
    means for selectively receiving the information stored in said first storage means incorporated in the processor units for which said second storage means indicates that the information stored in said first storage means is valid, and informing said processor units of completion of synchronization when all of said information indicate that execution of the program in said processor units have reached a point for synchronization.

2. A parallel computer system comprising:
    a plurality of processor units for executing programs;
    each of said processor units including first storage means for storing information indicating whether or not execution of a program by said corresponding processor unit has attained a point for synchronization;
    a network for interconnecting said plurality of processor units; said network comprising:
    second storage means in correspondence to said processor units, respectively, for storing information indicating whether the information stored in said first storage means is valid or not, and
    means for selectively receiving the information stored in said first storage means incorporated in the processor units for which said second storage means indicates that the information stored in said first storage means is valid, and informing said processor units of completion of synchronization when all of said information indicate that execution of the program in said processor units have reached a point for synchronization;
    wherein each of said processor units further includes a third storage means storing information indicating whether or not the corresponding processor unit is to execute a program in synchronism with execution of said program by the other processor units.

3. A parallel computer system according to claim 2, further comprising means, connected to said network, for setting information in said second storage means and altering the information stored in said second storage means.

4. A parallel computer system comprising:
    a plurality of processor units for executing programs;
    each of said processor units including:
        first storage means for storing information indicating whether or not corresponding processor unit is to execute a program in synchronism with execution of said program by the other processor units; and
        second storage means for storing information indicating whether or not execution of a program by said corresponding processor unit has attained a point for synchronization;
    a network for interconnecting said plurality of processor said network comprising:
        means for selectively receiving the information stored in said second storage means incorporated in a processor unit of which said first storage means has information indicating that the processor executes said program in synchronism with other processor units, and informing the processor units of completion of synchronization when all of said information in said second storage means indicate that executions of the program in corresponding processor units have reached a point for synchronization, and
        a plurality of third storage means corresponding to said plurality of processor units, respectively, each of said third storage means storing information indicating whether or not the corresponding processor unit is to execute a program in synchronism with execution of said program by the other processor units.

5. A parallel computer system according to claim 4, further comprising means, connected to said network, for setting information in said plurality of third storage means and altering the information stored in arbitrary ones of said plurality of third storage means.

* * * * *